Feb. 1, 1955
M. HENTER
2,701,171
VERTICAL FLANGED SHAFT AND THRUST BEARING
REMOVABLE TOGETHER FROM BEARING SUPPORT
Filed Dec. 17, 1951
2 Sheets-Sheet 2
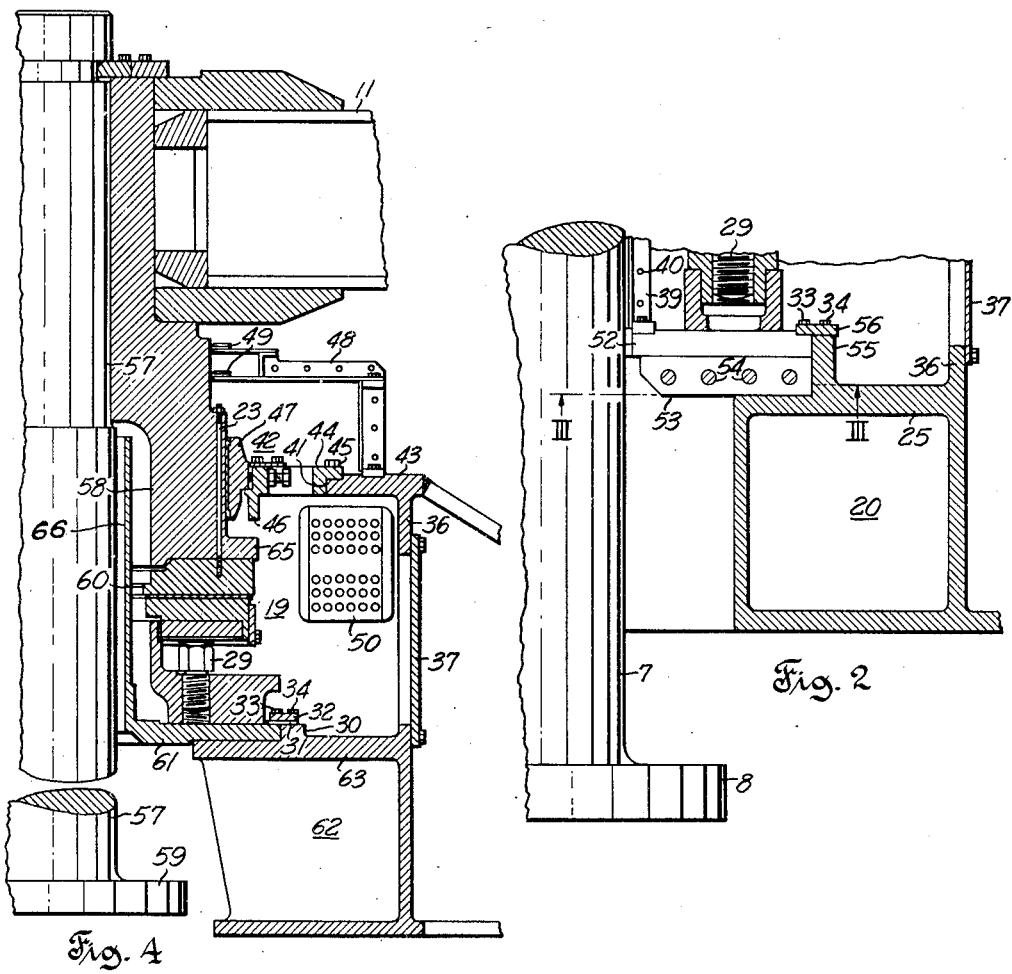
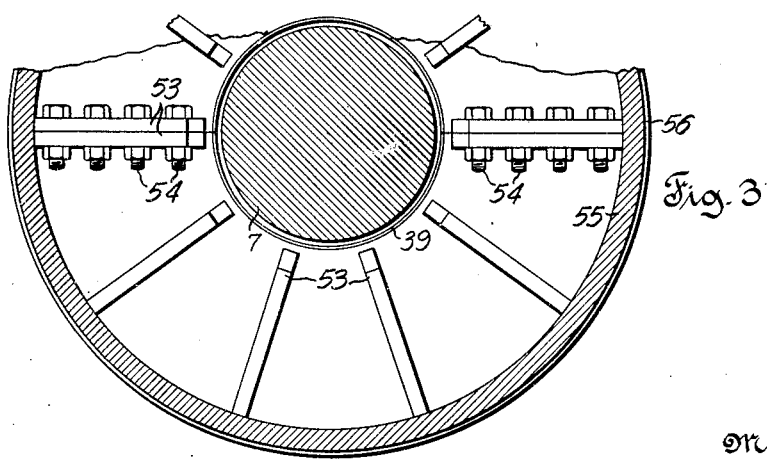

United States Patent Office 2,701,171
Patented Feb. 1, 1955

2,701,171

VERTICAL FLANGED SHAFT AND THRUST BEARING REMOVABLE TOGETHER FROM BEARING SUPPORT

Mathias Henter, Brookfield, Wis., assignor to Allis-Chalmers Manufacturing Company, Milwaukee, Wis.

Application December 17, 1951, Serial No. 262,136

5 Claims. (Cl. 308—160)

This invention relates to the combination of a vertical shaft having a flange and a thrust bearing with associated supporting structure, and particularly to the construction and arrangement thereof to provide for lifting and lowering of the shaft in the support structure while carrying the thrust bearing.

Large vertical shaft machines such as electric generators are frequently constructed with the rotor located at the upper end of the shaft and the lower portion of the shaft extending downward through supporting structure. The shaft has a flange for coupling to a prime mover such as a hydraulic turbine. The thrust bearing provided is located below the rotor and is supported on a bearing bracket secured to the foundation.

Heretofore, in hydraulic turbine driven generators, a downward removable split centerpiece was built into the bearing bracket for supporting the thrust bearing. In order to remove the shaft, the centerpiece had to be lowered and removed from the bearing bracket to permit the shaft flange to pass through the bearing bracket. Such arrangement required a shaft of relatively great length to provide the necessary space between the bearing bracket and shaft flange for the installation or removal of the centerpiece. Use of such an arrangement has proved difficult and expensive.

The above disadvantages are overcome by the arrangement in the present invention which provides a rigid bearing bracket through which the shaft flange may pass without requiring the lowering of any support structure. This arrangement also provides for removal of the shaft, rotor and thrust bearing as a unit without disturbing the bearing bracket on its foundation.

It is, therefore, an object of the present invention to provide a vertical flanged shaft with an improved arrangement of the thrust bearing and bearing bracket to permit the shaft and shaft flange to be readily lifted through the bearing bracket.

Another object of this invention is to provide a thrust bearing and a radial bearing for a vertical flanged shaft so constructed and arranged that the bearings are carried by the shaft when the shaft is lifted through the bearing bracket.

Another object of the invention is to provide the combination of a thrust bearing and a vertical shaft having an integral flange and an integral thrust block with an improved bearing support which permits removal of the shaft without disassembly of the bearing support.

Other objects and advantages will be apparent upon a reading of the following description taken with the accompanying drawings, in which:

Fig. 2 is a modification of the thrust bearing support of the machine of Fig. 1;

Fig. 3 is a sectional view of the support shown in Fig. 2 taken along the line III—III; and Fig. 4 is a view in vertical cross section of a portion of another embodiment of the present invention.

Figure 1:
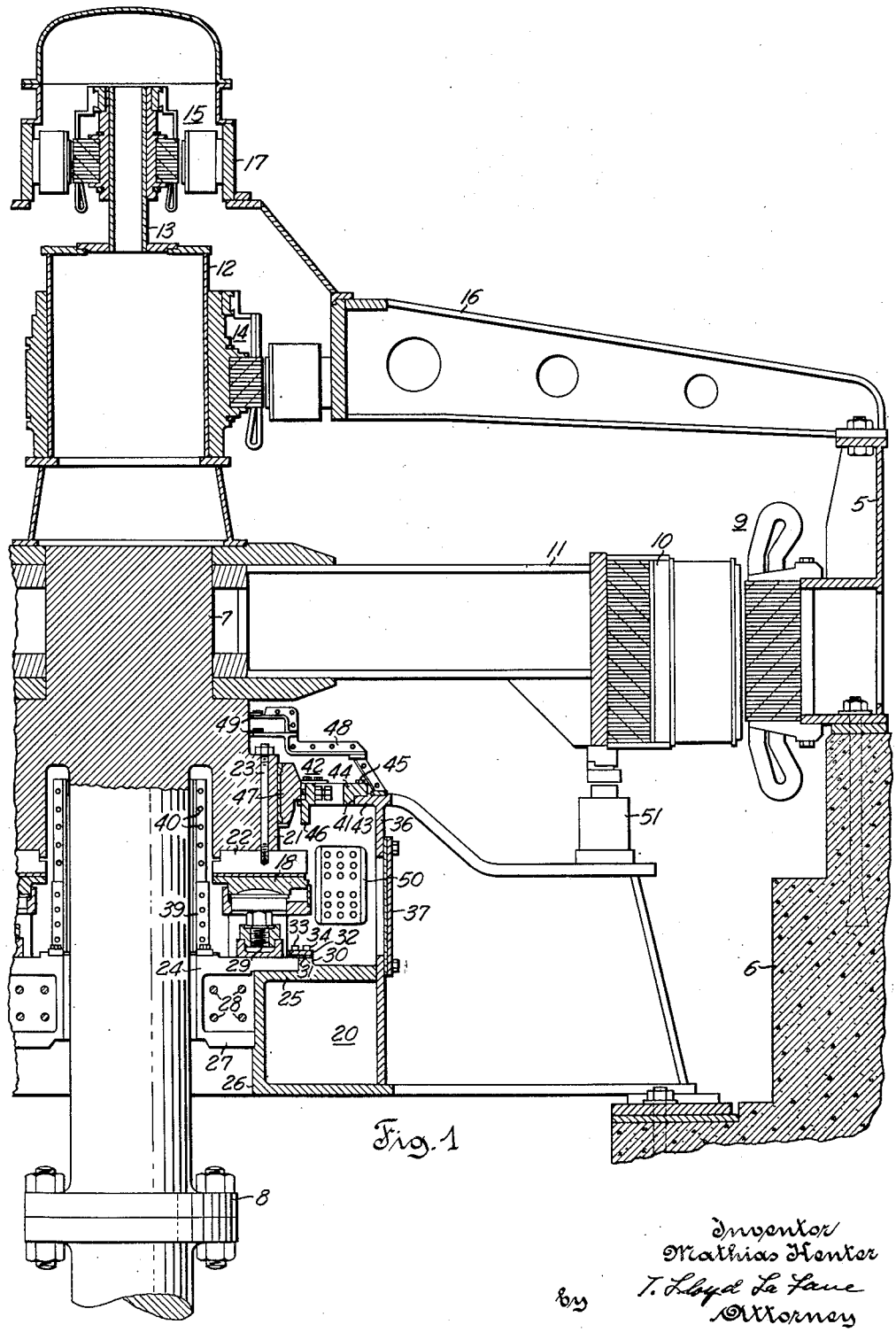
Fig. 1 is a view in vertical cross section of a portion of a vertical shaft machine embodying the present invention.

Referring more particularly to the drawing, numeral 5 indicates the frame or housing of a vertical shaft dynamoelectric machine supported on a foundation 6. The dynamoelectric machine may be a generator having a shaft 7 with an integral flange 8 for coupling to a similar flange on the shaft of a hydraulic turbine (not shown). The generator comprises an armature 9 secured within the housing, and for rotation within the armature a field member 10 is mounted on a rotor spider 11 secured to the shaft. The shaft 7 has removable portions 12, 13 which extend the shaft above the rotor to support exciters 14 and 15. The frame 5 includes removable members 16, 17 which support and house the stators of exciters 14, 15 and also house the rotor and stator of the generator.

The shaft 7 is supported on the foundation 6 through a suitable thrust bearing and a bearing bracket 20. The thrust bearing comprises a thrust block 21 which is rotatable with the shaft and integral therewith, as shown in Fig. 1. A runner 22 having a bore whose diameter is less than the outside diameter of shaft flange 8 is secured to the bottom face of thrust block 21 by studs 23. Runner 22 is split in at least two sections for assembly.

The runner engages, in a well known manner, the bearing surfaces of the thrust receiving and stationary bearing members, comprising suitable bearing shoes 18 and jack screws 29 supported on a split base ring 24 having a bore whose diameter is substantially less than the outside diameter of the shaft flange. Base ring 24 is supported on a lower deck 25 which is an integral portion of bearing bracket 20. Deck 25 has a relatively large bore 26 whose diameter is larger than the outside diameter of shaft flange 8 so that the flange may freely pass therethrough when the shaft is lifted. The bore 26 of deck 25 has a diameter smaller than the diameter of the cylindrical surface defined by the axes of jackscrews 29. Base ring sections have radial ribs or flanges 27 projecting downward within the bore 26. Bolts 28 secure adjacent flanges of the base ring sections together.

The base ring 24 and deck 25 have an oil tight seal comprising a shoulder 30 integral with deck 25 coaxially of base ring 24. The upper surface of shoulder 30 and base ring 24 are in one plane. An annular gasket 31 overlies these upper surfaces of the base ring and shoulder. The gasket 31 is held by an annular plate 32 secured by bolts 33 to the base ring 24 and by bolts 34 to the deck 25.

The thrust bearing is housed in a substantially annular oil pot having a bottom formed by the base ring 24 and the deck 25. The radially outer wall of the oil pot is formed by a wall 36 provided with large openings closed by cover plates 37 which are removable to provide access to the thrust bearing to provide servicing and to remove bearing runners and bearing shoes. The radially inner wall of the oil pot is formed by a split sleeve 39 surrounding the shaft and secured at its bottom in oil tight relation to the base ring 24 in any suitable manner, as by welding or, as shown, by bolting to the base ring. The split sleeve comprises flanged sections with the flanges secured together in oil tight relation in any suitable manner such as by bolts 40.

The top of the oil pot is formed by an upper deck 43 which has a relatively large bore or opening 41 through which the thrust bearing and base ring 24 can pass. A suitable radial bearing 42 cooperating with thrust block 21 is supported within the oil pot opening 41 on the upper deck 43 of the bearing bracket structure. A ring 44 supports the radial bearing and is secured to the deck by bolts 45. The ring support for the radial bearing includes a projection 46 which extends downward as far as the lower side of the radial bearing shoes 47, so that the runner 22, which extends radially outward beneath the radial bearing, engages the lower surface of the shoes 47 and the projection 46 to support the radial bearing as a unit when bolts 45 are removed and the shaft and runner are lifted. The top of the oil pot is closed by a removable housing 48 which supports suitable oil vapor seals 49.

The oil pot may also contain a suitable removable cooler 50 located in the radially outer portion of the oil pot so that the cooler need not be removed when the shaft and thrust bearing are to be lifted as a unit.

The structure of the vertical shaft machine in which the shaft flange and thrust block are integral with the shaft and comprising thrust and radial bearings may be assembled in position about the shaft outside of the oil pot and inserted therein as a unit with the shaft. The method of assembly of the machine with the shaft outside of the oil pot comprises mounting the halves or sections of runner 22 to thrust block 21 and securing the halves thereto by studs 23. The sections of sleeve 39 and the sections of base ring 24 are then disposed about the shaft and the sections are secured together. The sleeve is secured to the base ring. The base ring and sleeve are supported on flange 8 of the shaft. The thrust receiving bearing elements comprising shoes 18 and jackscrews 29 are then mounted on base ring 24. Radial bearing 42 may also be assembled and secured as a unit within its retainer ring 41 outside of the oil pot. The radial bearing is supported on the radially projecting portion of thrust block 21 or its runner 22. Jack 51, mounted on bracket 20, serves for lifting the rotor and shaft a limited extent for separating the runner 22 from the bearing shoes.

After the thrust and radial bearing elements have been assembled and secured on the shaft, the rotor spider 11 is secured to the shaft in any suitable known manner. The shaft is then lowered through the oil pot; the flange 8 passing through bore 26 in the bearing support bracket 20, and base ring 24 passing through oil pot opening 41, clears cooler 50 and seats on deck 25 to cause the thrust bearing shoes to engage the runner for supporting the shaft and rotor. As the shaft is lowered, the retainer ring 44 for the radial bearing seats on the upper deck 43 of the bearing bracket to support the radial bearing in position. Bolts 45 secure the radial bearing retainer to upper deck 43, and bolts 34 secure the oil seal plate 32, gasket 31 to shoulder 30 of lower deck 25. Oil pot hood or housing 48 is secured to the bearing bracket after the radial bearing is properly in place.

Although radial and thrust bearing elements may be independently removed from the oil pot or adjusted therein, both the radial and thrust bearing elements may be removed from the oil pot with the shaft, if so desired, by merely removing oil pot housing 48 and removing bolts 45 securing retainer ring 44 to the upper deck 43 and by removing bolts 34 securing oil seal plate 32 to the lower deck 25. Upon lifting of the shaft, after removal of bolts 45 and 34, the radial bearing 42 is picked up by runner 22 and the stationary thrust bearing elements are picked up by the shaft flange 8 which engages the ribs 27 of the base ring 24. Flange 8 passes through bore 26 in lower deck 25 of bearing bracket 20 and base ring 24 passes through the oil pot and through the opening 41 in upper deck 43 of bearing bracket 20.

As illustrated in Figs. 2 and 3, a modification of the thrust bearing support of the machine shown in Fig. 1 comprises a base ring 52 having a plurality of reinforcing ribs 53 which extend radially substantially from the bore of the base ring to the outer periphery thereof. The base ring is split in halves, each of which has ribs 53 along the section line. The adjacent ribs of the halves are removably secured together by bolts 54. The ribs 53 of the base ring seat on the deck 25 of bearing bracket 20. Base ring 52 is sealed in oil tight relation with deck 25 by a ring 55 which may be integral with the deck 25 and abut the side of base ring 52 which is held in oil tight engagement with ring 55 by an overlapping annular plate 56 secured by suitable bolts 33, 34 to the base ring 52 and ring 55.

The embodiment of the invention illustrated in Fig. 4 differs primarily from that shown in Fig. 1 in having a thrust block 58 that is not integral with the shaft 57 but removably mounted thereon, as with an interference or slip fit, and keyed to the shaft in a suitable known manner. The shaft 57 has a flange 59 integral therewith for coupling to a prime mover.

The thrust bearing 19 and the radial bearing 42 which cooperates therewith while independently removable from the oil pot, may also be removed therefrom by shaft 57 when it is lifted. Inasmuch as thrust block 58 is removable, runner 60 secured thereto, is not split but is a continuous annular member. Similarly, the base ring 61 is not split but is a continuous annular member having an oil retainer sleeve 66 welded thereto which is also a continuous cylindrical member. Base ring 61 is supported on the deck 63 of a bearing bracket 62 which has a bore whose diameter is larger than the diameter of flange 59 so that the flange may pass freely therethrough when the shaft is lifted out of the oil pot. Thrust block 58 has an integral collar 65 which projects radially outward beneath radial bearing 42 and serves as the support means for carrying the radial bearing when the shaft is lifted. Thus, when the shaft is lifted, the flange 59 passes through the bearing bracket 62 and picks up base ring 61 to carry the base ring and stationary elements of the thrust bearing out of the oil pot with the shaft, and the thrust block picks up the radial bearing to carry it out with the shaft.

Although but a few embodiments of the present invention have been shown and described, it will be apparent to one skilled in the art that various changes or modifications may be made therein without departing from the spirit of the invention or from the scope of the appended claims.

It is claimed and desired to secure by Letters Patent:

1. In combination, a vertical shaft having a flange integral therewith, a thrust bearing for said shaft including a thrust block rotatable with said shaft above said flange, a runner adjacent the lower face of said thrust block, means connecting said runner to said thrust block for rotation therewith, thrust receiving members including a plurality of bearing shoes on which said runner bears, a sectional cage containing jackscrews for pivotally supporting said shoes, said jackscrews disposed about said cage with the axes of said jackscrews in a cylindrical surface coaxial with said shaft, and a base ring supporting said cage and said shaft, said base ring having an inside diameter substantially smaller than the diameter of said flange, a deck supporting said base ring and having a bore whose diameter is larger than said flange diameter and smaller than the diameter of said cylindrical surface, a radial bearing for said shaft cooperating with a surface of said thrust block, a common annular oil pot for said bearings, said oil pot comprising an outer wall forming a housing for said bearings, said pot having a bottom formed by said deck and said base ring, and an inner wall consisting of a sleeve secured to said base ring, and means for supporting said radial bearing on said thrust block; whereby said thrust block carries said radial bearing and said shaft flange carries said base ring and said thrust receiving members when said shaft is lifted out of said deck.

2. In combination, a vertical shaft having a flange integral therewith, a thrust bearing for said shaft including a thrust transmitting block rotatable with said shaft above said flange, thrust receiving members including a stationary bearing and a base ring supporting said stationary bearing and receiving the thrust of said shaft, said stationary bearing including a plurality of bearing shoes and jackscrews for pivotally supporting said shoes for engagement with a bearing surface of said thrust transmitting block, said jackscrews circumferentially disposed with the axes thereof in a cylindrical surface coaxial with said shaft, said base ring having an inside diameter substantially smaller than the diameter of said flange, a deck supporting said base ring and having a bore whose diameter is smaller than the diameter of said cylindrical surface and larger than said flange diameter so that said flange passes through said bore of said deck and carries said thrust receiving members including said base ring when said shaft is lifted.

3. In combination, a vertical shaft having a flange integral therewith, a deck, a thrust bearing for rotatably supporting said shaft on said deck, said thrust bearing comprising a thrust transmitting block rotatable with said shaft above said flange, and thrust receiving members including a base ring having a relatively small bore through which said shaft flange cannot pass when said shaft and flange are lifted, said base ring removably mounted on said deck and solely supporting said shaft and said thrust bearing on said deck, said deck having a relatively large bore to permit said flange to pass through said bore of said deck and carry said base ring and said thrust bearing when said shaft is lifted.

4. In combination, a vertical shaft having a flange integral therewith, a deck, a thrust bearing for rotatably supporting said shaft on said deck, said thrust bearing comprising a thrust transmitting block integral with said shaft above said flange and thrust receiving members including a split base ring having a relatively small bore through which said flange cannot pass when said shaft and flange are lifted, said base ring removably mounted on said deck and solely supporting said thrust bearing and said shaft, said deck having a relatively large bore through which said flange passes when said shaft and flange are lifted, and an annular oil pot for said thrust bearing, said oil pot comprising an outer wall forming a housing for said thrust bearing, said pot having a bottom wall formed by said deck and said base ring and an inner wall consisting of a split sleeve disposed about said shaft and secured to said base ring, said deck having a relatively large bore to permit said shaft flange to pass through said bore to engage said base ring and carry said base ring and said thrust receiving members when said shaft is lifted out of said deck.

5. In combination, a vertical shaft having a flange integral therewith, a deck, a thrust bearing rotatably supporting said shaft on said deck, said thrust bearing comprising a thrust block removably mounted on said shaft above said flange, thrust receiving members including a base ring solely supporting said shaft on said deck, said base ring being a continuous cylindrical piece having a bore whose diameter is substantially less than the outside diameter of said flange, said deck having a bore with a diameter larger than said outside diameter of said flange to permit said flange to pass through said bore in said deck and carry said base ring and said thrust receiving members when said shaft is lifted.

References Cited in the file of this patent

UNITED STATES PATENTS

| | | |
|---|---|---|
| 1,456,804 | Kingsbury | May 29, 1923 |
| 1,971,412 | Howarth | Aug. 28, 1934 |
| 2,061,966 | Howarth | Nov. 24, 1936 |